Oct. 14, 1947. E. M. GUYER 2,428,969
GLASS HEATING AND WORKING
Filed Oct. 11, 1943
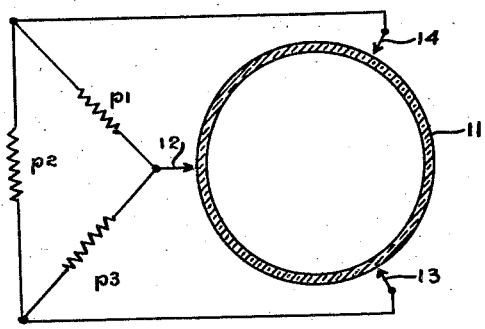
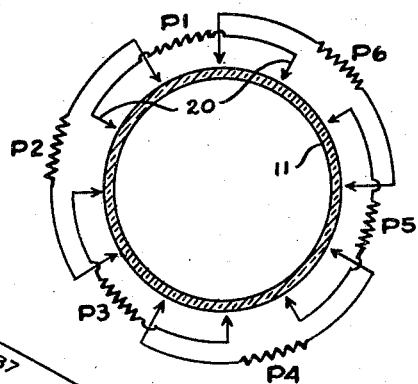
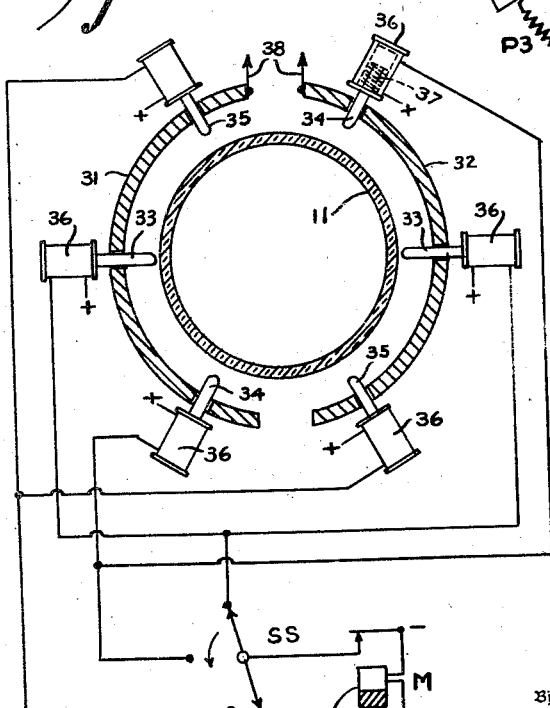
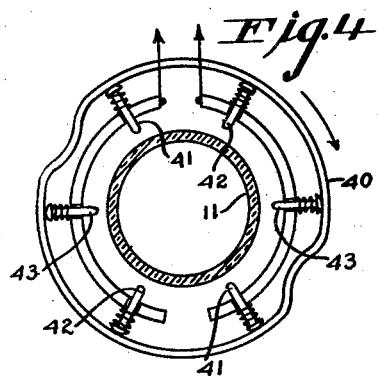
Inventor
EDWIN M. GUYER
By
T. H. Knight
Attorney Patented Oct. 14, 1947

2,428,969

UNITED STATES PATENT OFFICE 2,428,969

GLASS HEATING AND WORKING

Edwin M. Guyer, Corning, N. Y., assignor to Corning Glass Works, Corning, N. Y., a corporation of New York Application October 11, 1943, Serial No. 505,854

5 Claims. (Cl. 219—19)

The present invention relates to means and methods for the electrical heating of glass to temperatures proper for manipulation and fusion in which heat is generated in the glass itself by its resistance to the flow of an electric current. It has heretofore been proposed to heat an endless stripe or band about an article of revolution to a condition suitable for working, by introducing heating current from one electrode into a portion of the stripe and withdrawing the current through an electrode associated with another portion of the stripe, while effecting relative movement between the electrodes and article as required to heat the entire stripe at the desired temperature for working.

It is an object of the present invention to effect electrical distribution of energy over the entire path to be heated by electric field variation, thereby avoiding the necessity for relative movement and thus greatly simplifying the operation particularly for application on massive glassware of irregular shape wherein energy distribution would be very difficult or impossible of application in the relative motion system.

Another object of the invention is a method of electrical energy distribution which obviates the need for circuit switching operations which are particularly difficult with current such as required for glass melting operations.

A further object is a method of energy distribution wherein there is limited movement between the glass to be heated and the electrodes employed.

A still further object is a method of electrical glass working energy distribution such that regions which are directly under one set of electrodes are at times supplied with heating current from electrodes remote from such regions.

Other objects and features of the invention will become apparent to those skilled in the art in the course of the description of the methods and apparatus herein described as preferred embodiments of the invention.

In the accompanying drawings Fig. 1 diagrammatically shows an arrangement whereby an endless band about a glass article may be heated to a condition suitable for working by current from three stationary electrodes supplied with heating current from a three-phase current supply system.

Fig. 2 is a view similar to Fig. 1 showing an arrangement whereby an endless band about a glass article may be heated by current supplied from twelve electrodes suitably connected to a six-phase heating current supply system.

Fig. 3 diagrammatically discloses apparatus by means of which an endless stripe of glass may be heated to a condition for working by selectively moving pairs of heating current electrodes into conductive relation with a glass body.

Fig. 4 illustrates an alternative arrangement to that shown in Fig. 3.

Referring again to Fig. 1, there is shown a cylindrical glass article 11, an endless band about which it is desired to heat to a suitable condition for working. To accomplish this, three electrodes 12, 13, and 14 are equally spaced around the article thereby dividing the band to be heated into three equal length sections. The heating current at first passes in the form of a spark discharge between a pair of electrodes, as 12 and 13, along the line of the glass in the region where it is desired to form the hot stripe. As the glass along this line is raised in temperature its resistance is lowered until it becomes less than the air gap across its surface at which time it commences to carry current. From this time on heat is developed in the glass very rapidly as its conductivity increases with its temperature. As will be evident, with the three-phase current system, identified as $p1$, $p2$, and $p3$, connected to the electrodes as shown, heating current successively flows along the glass surface from one electrode to another until the glass becomes conductive after which the current flows consecutively through the glass of the respective sections a section at a time until the glass reaches the desired temperature for working. The heating is thus accomplished in a simple manner without the necessity for relative movement between the glass and electrodes and without resort to external circuit switching operations. The time of heating can be materially reduced by preheating the article 11 to a conductive temperature prior to subjecting it to current from electrodes 12, 13, and 14. Such preheating of a group of articles 11 can be effected in a suitable preheating furnace and the articles transferred one at a time to the electric heating equipment of Fig. 1.

It may sometimes occur that the character or shape of the ware is such that proper heating of the glass immediately adjacent the electrodes of a system such as shown in Fig. 1 is not realized. To overcome such possible objection the arrangement shown in Fig. 2 may be employed. In Fig. 2 the glass article 11 is surrounded by six pairs of electrodes 20, each pair being connected to a different phase of a six-phase current supply system, P1–P6, and each pair of electrodes is arranged to heat a section of glass including portions of a section of the path arranged to be heated by current from electrodes of other pairs. Thus interlaced or overlapped heating current supply paths are provided which positively assure uniform heating of all sections of the band.

In the structure of Fig. 3 the glass article 11 is substantially surrounded by a pair of bus bars 31 and 32 continuously supplied with heating current from conductors 38. Pairs of electrodes 33, 34, and 35 associated with bus bars 31 and 32 are movable with respect thereto into and out of heating relation with the glass article 11. Each electrode is normally held out of heating relation with the glass article in any convenient manner, as by a spring 37, and is adapted to be selectively brought into heating relation with the glass article by means of a solenoid 36. The several solenoids 36 are connected in oppositely disposed pairs and are arranged to successively receive operating current through the bank contacts and wiper of a switch SS which is operated step-by-step by a retarded action magnet M whenever the hand switch HS is closed.

In this character of system it is desirable that the article 11 be preheated to a conductive temperature before electric heating is started so as to provide a conductive path around the periphery of the article. When the first pair of electrodes, 33 for example, are brought into heating relation with the article, it being in a uniformly heated condition, substantially an equal amount of current passes from electrodes 33 in opposite directions about both halves of the circumference of the article. When, however, the next pair of electrodes, electrodes 34, are brought into heating relation with the article that half of its periphery between electrodes 34 in the direction of scanning includes two-thirds of the circumference previously between electrodes 33 whereas the remaining half of the periphery between electrodes 34 only includes one-third of the periphery previously between electrodes 33. As will be appreciated, therefore, the major portion of the current flow between successively effective pairs of electrodes will always be through the half of the article periphery in the direction of scanning. Since such half of the article periphery always includes a portion of the periphery just previously heated, it will be apparent, the advantages of interlacing described in connection with Fig. 2, are also inherent in the structure shown in Fig. 3.

In the disclosure of Fig. 4 the operation is the same as in Fig. 3 except that a cam 40 is rotated in any suitable manner to directly actuate oppositely disposed pairs of electrodes 41, 42, and 43 in succession to obtain the same results as when the solenoids 36 and switch SS are employed.

Although the present invention has been described in connection with certain specific forms of apparata and circuits as applied to the heating of a circular glass article, it is to be understood that these are disclosed by way of illustration only and that heating of non-circular articles by the disclosed and various equivalent structures may be practiced without deviating from the spirit and scope of the invention as claimed.

I claim:

1. In an electrical system for heating a restricted endless stripe about a glass body, at least three pairs of electrodes substantially equally spaced from one another about the article along the path of the desired stripe with the portion of the path between each pair of electrodes occupied by an electrode of another of the respective pairs of electrodes.

2. In an electric heating apparatus, a pair of banks of electrodes arranged about an area of glass to be heated by pairs of said electrodes, means for continuously applying heating current to said banks of electrodes, and means for selectively shifting electrodes of the respective banks into positions to establish flow of heating current through selected sections of the glass.

3. In an apparatus for electrically heating bounding edges of a glass article to a temperature suitable for working, conductive supports adapted to be arranged about bounding edges of the article at substantial distance therefrom, groups of movable electrodes each electrode of a group being permanently electrically connected with one of said supports and means for selectively moving electrodes of the supports toward the bounding edges of the article into heating relation therewith.

4. The method of heating an endless band of glass to a desired working temperature by a multiphase current supply which includes spacing heating electrodes along the path to be heated double in number to the number of current supply phases, connecting the terminals of each phase to a pair of the electrodes between which others of the electrodes are arranged so that the current supplied by each phase passes through a portion of a section of the band between the electrodes connected to at least another phase whereby over-lapped heating by the sequential heating action of the respective phases is effected.

5. The method of heating an endless band of glass to a desired working temperature, which includes spacing pairs of electrodes along the path to be heated in sufficient number that the portion of the path between each pair of electrodes equals less than half the path length and with one electrode of each pair in a space along the path between the electrodes of another pair thereof and applying potentials to the respective electrode pairs in sequence.

EDWIN M. GUYER.

REFERENCES CITED

The following references are of record in the file of this patent:

UNITED STATES PATENTS

| Number | Name | Date |
|---|---|---|
| 2,306,054 | Guyer | Dec. 22, 1942 |
| 916,959 | Cummins | Mar. 30, 1909 |
| 2,286,210 | Klemperer et al. | June 16, 1942 |
| 722,701 | Hanks | Mar. 17, 1903 |
| 1,589,235 | Schroder | June 15, 1926 |